May 28, 1957  L. L. FIELDER, JR., ET AL  2,793,715
SPEED AND DIRECTION RESPONSIVE BRAKE
Original Filed Feb. 2, 1953  2 Sheets-Sheet 2
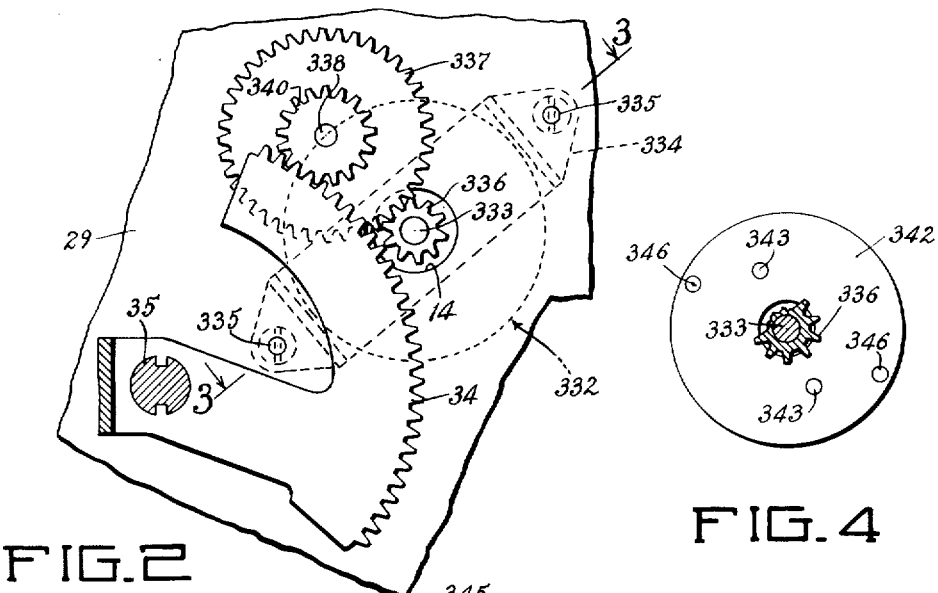
FIG.2
FIG.4
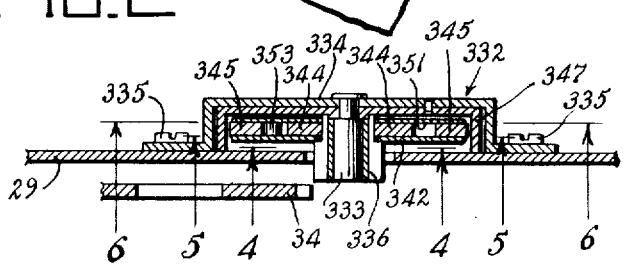
FIG.3
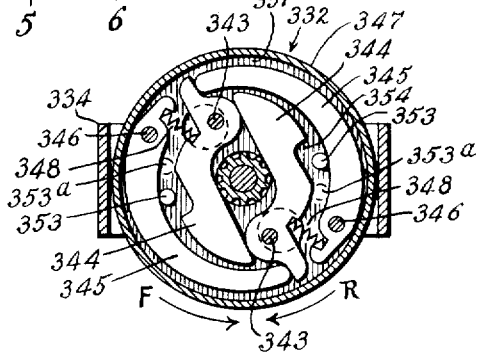
FIG.5
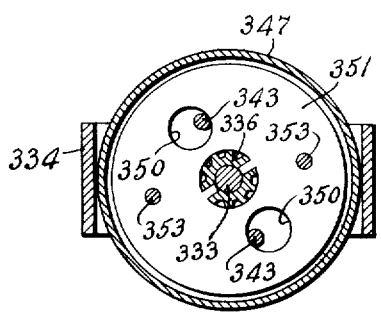
FIG.6
*INVENTORS,*
Bryan F. Kuhne &
BY  Lloyd L. Fielder Jr.
ATTORNEY.

United States Patent Office 2,793,715
Patented May 28, 1957

2,793,715

SPEED AND DIRECTION RESPONSIVE BRAKE

Lloyd L. Fielder, Jr., Arcadia, and Bryan F. Kuhne, Duarte, Calif., assignors to Clary Corporation, a corporation of California Original application February 2, 1953, Serial No. 334,632, now Patent No. 2,744,682, dated May 8, 1956. Divided and this application June 1, 1954, Serial No. 433,684

4 Claims. (Cl. 188—184)

This invention relates to speed governing mechanisms and has particular reference to governing mechanisms for use in controlling adding or calculating machines and the like wherein a manually operable handle is used to actuate the machine.

Machines of the above type generally embody relatively complex mechanisms which must operate in concert with each other. Certain of such mechanisms generally have definite limitations in speed and any excessive speed tends to either cause malfunctioning or physical damage to the parts.

Operation of the drive handle on the other hand is subject to human variations in speed and force and it is therefore necessary in most cases to provide a speed governing device.

It has been discovered that most adding and calculating machines of the above type are capable of a higher speed during movement of the handle in one direction than when moved in the opposite direction although most prior-art speed governors provided for this purpose incorporate the same speed characteristics in both directions.

It therefore becomes the principal object of the present invention to provide a speed governor whose governing action is different when operated in one direction than when operated in the opposite direction.

Another object of the invention is to provide a speed governor adapted to govern a driven part at one speed during movement in one direction and to govern said part at a different speed during movement thereof in the opposite direction.

Another object is to provide a fly-weight-drag type speed governor in which one or more flyweights are automatically rendered effective in one direction and ineffective in the opposite direction of movement.

Another object is to provide a simple, compact, fly-weight-drag type speed governor.

The manner in which the above and other objects of the invention are accomplished will be readily understood on reference to the following specification when read in conjunction with the accompanying drawings, wherein:

Fig. 2 is a side view taken along the left hand side of the machine, illustrating the connection between the drive shaft and the speed governor.

Fig. 3 is a longitudinal sectional view through the speed governor and is taken along the line 3—3 of Fig. 2.

Fig. 4 is a sectional view of the speed governor and taken along the line 4—4 of Fig. 3.

Fig. 5 is another sectional view of the speed governor and is taken along the line 5—5 of Fig. 3.

Fig. 6 is another sectional view of the governor and is taken along the line 6—6 of Fig. 3.

Figure 1:
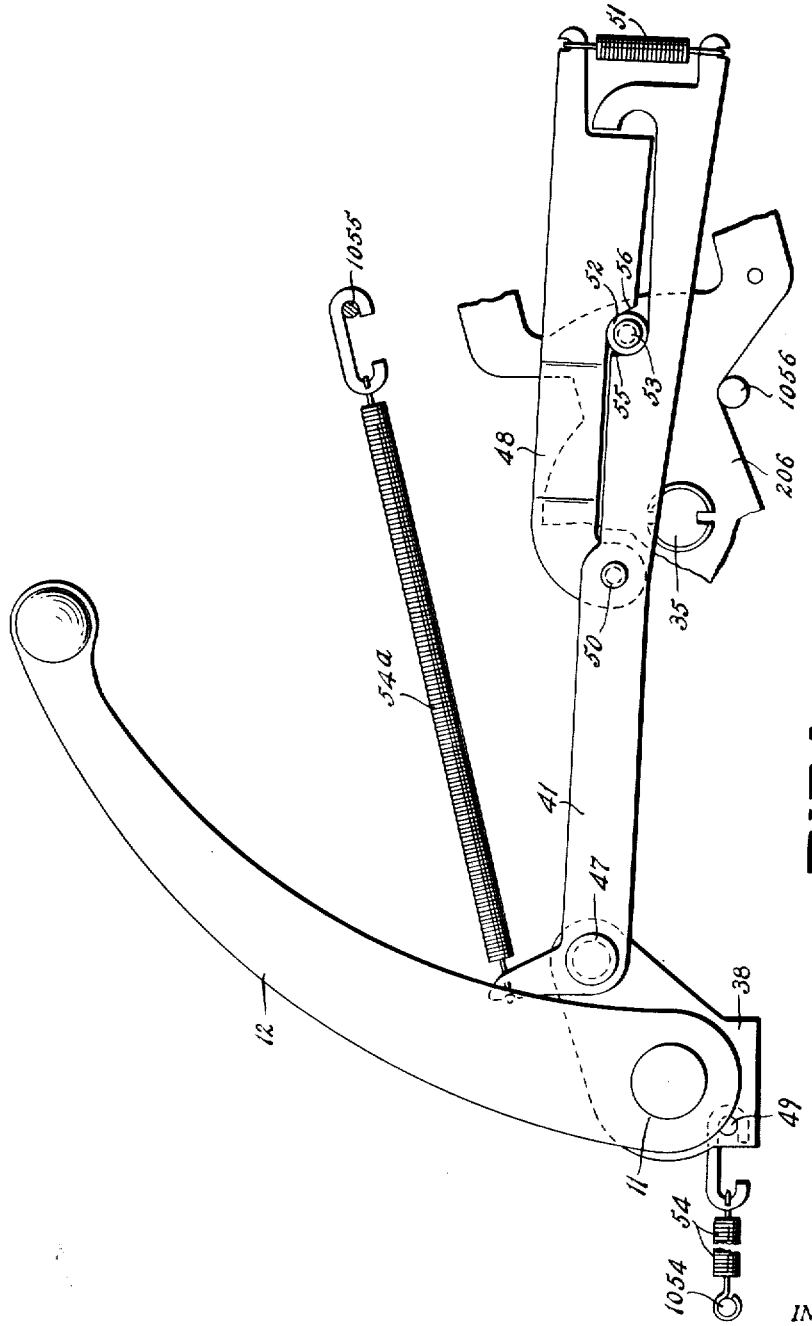
Fig. 1 is a side view, illustrating a drive handle and its connection to the main drive shaft of an adding machine embodying a preferred form of the present invention.

The present application is a division of the co-pending application, Serial No. 334,632, filed on February 2, 1953, now Patent No. 2,744,682, and entitled Calculating Machine.

Reference is hereby made to said co-pending application for a complete disclosure of an adding or calculating machine in which the present invention is embodied. It should be noted, however, that the invention may be equally well applied to other forms of calculating machines or other types of handle driven machines.

As disclosed in the above application, the machine comprises a rockable drive shaft 35 suitably supported for pivotal movement in bearings not shown carried by spaced machine frame plates, one of which is shown at 29, Fig. 2. The shaft 35 carries various drive instrumentalities for operating the different mechanisms of the machine in proper sequence during both forward and reverse movement of the same.

For the purpose of rocking the shaft, a handle 12 is provided, the latter extending to one side of the machine. Means (not shown) are provided for pivotally supporting the handle for movement about the axis of its hub 11.

The handle is fixedly connected to a bail 38 pivotally connected at 47 to a drive link 41. The link 41 forms part of a yieldable connection between the handle 12 and the drive shaft 35, and for this purpose a driving pawl 48 is pivoted at 50 to link 41. A spring 51 is tensioned between the right hand ends of the pawl 48 and link 41 to hold the same in contact with a roller 52 pivotally mounted on a pin 53 which is secured to a drive sector 206 keyed on the drive shaft 35. A vertical shoulder 55 on the link 41 numerally engages the roller 52 on one side thereof, whereas an inclined shoulder 56 of the pawl 48 engages the roller on the opposite side thereof.

Accordingly, the sector 206 will normally follow the link 41 during forward movement of the handle (to the left of Fig. 1) and thus rock the shaft 35, but in the event that any part of the machine should be jammed or the machine operated at an excess speed during forward movement of the handle 12, the inclined edge 56 will move over the roller 52. This will cause the spring 51 to yield and permit the link 41 to move forwardly relative to the roller 52 as the handle is advanced. The shoulder 55 on the link 41 will be effective to invaribly force the roller 52 and consequently the drive shaft 35 to return clockwise to their home positions illustrated in Fig. 1 should the hand crank be positively returned.

Means are provided for spring returning the parts including the drive shaft 35, to their home positions shown in Fig. 1 and for this purpose two tension springs 54 and 54a are provided. The former is tensioned between a pin 49 on the bail 38 and a frame stud 1054 while the latter is tensioned between an extension of the link 41 and a frame pin 1055. Both springs are normally effective to return and hold the sector 206 in its home position where it rests against a frame pin 1056.

According to the present invention a speed governor generally indicated at 332, Figs. 2 to 6, inclusive, is provided to control the speed of operation of the machine by the handle 12. Since the arrangement of the handle 12 is such as to be susceptible to being normally driven at an excessive speed during its forward stroke only, the governor is rendered effective to limit the speed of operation of the machine during the first half of a machine cycle, i. e., during the forward stroke of the handle.

The governor comprises a support pin 333 riveted at one end thereof on a bracket 334. The latter is removably secured to the left hand machine frame plate 29 by screws 335 whereby the pin extends coaxially through an opening 14 in the plate 29. A gear 336 forming a driving element of the governor, is rotatably mounted on the pin 333 and meshes with a large gear 337 of a compound idler which is rotatably mounted on a frame pin 338 extending from the machine frame plate 29. A small gear 340 of the compound idler meshes with a gear sector 34 keyed on the shaft 35 whereby to reversely drive the gear 336 at a relatively high rate of speed.

Freely mounted on a reduced portion of the gear 336 for relative rotation therewith is a disc or plate 342. The latter carries pins 343 on which are pivoted two flyweights 344. The latter engage the outer ends of arcuate brake shoes 345 pivoted on pins 346 also extending from the disc 342. The brake shoes 345 are adapted to engage the inner periphery of the stationary drum 347 rigidly secured to the bracket 334.

When the machine is at rest the brake shoes are retained from engaging the drum by compression springs 348 extending between the shoes and their respective flyweights 344. The aforementioned pivot pins 343 for the flyweights extend through openings 350 (Fig. 6) in a second disc or flange 351 which is suitably secured to the inner end of the gear 336.

During a forward movement of the handle the entrained gearing shown in Fig. 2 will cause rotation of the gear 336 and disc 351, integral therewith, in the direction of the arrow F, in Fig. 5, causing the lagging edges of the openings 350 to pick up the pins 343 and consequently drive the free disc 342, thus carrying the brake shoes and flyweights in the same direction.

As the governor approaches its critical speed, depending upon the mass of the flyweights, the latter rock outwardly about their pins 343 to likewise force their respective brake shoes 345 into frictional engagement with the inner periphery of the drum 347 and thus exert a controlling drag on the shaft 35. At this time, the disc 351 will have been positioned counterclockwise relative to the disc 342 whereby to carry pins 353 thereon into alignment with pockets 354 formed in the flyweights so as not to impede the outward movement of the latter.

During return of the handle, the disc 351 will be rotated clockwise in the direction of the arrow R of Fig. 5. Consequently, the disc 351 will advance clockwise relative to the disc 342 an amount dependent upon the width of the openings 350. Thereafter, the two discs rotate as a unit carrying the flyweight and brake shoes therewith. However, at this time the pins 353 will have advanced to the broken line positions shown at 353a wherein they will be located directly in front of the adjacent portions of the flyweight levers 344, thereby preventing substantial outward movement of the latter.

The brake shoes are preferably made of light plastic material and therefore have a relatively small mass. Accordingly, the brake shoes will be substantially ineffective to create a drag during the return movement of the handle.

If desired, to effect a partial drag during return movement of the handle, one of the pins 353 may be removed, thus permitting one of the flyweights only to exert a full controlling effect on its brake shoe.

Although we have described our invention in detail and have therefore used certain terms and languages herein, it is to be understood that the present specification is illustrative rather than restrictive, and that changes and modifications may be made without departing from the spirit or scope of the invention as set forth in the claims appended hereto. For example, the mass of each of the brake shoes may be increased to a point where such shoe may be effective to exert an appreciable drag during movement of the governor in the direction of the arrow R even though the flyweights 344 are restricted from action by the pins 353.

Having thus described our invention, what we desire to secure by United States Letters Patent is:

1. A speed governing device comprising a stationary casing having a circular braking surface, a drive member rotatable about the axis of said braking surface, a driven member rotatable about said axis and relative to said drive member, means forming a lost motion connection between said members permitting a limited relative rotation therebetween, a friction shoe, means on said driven member supporting said friction shoe for movement outwardly into contact with said braking surface in response to centrifugal force, a fly-wheel, means on said driven member supporting said flyweight for movement against said friction shoe whereby to move said friction shoe outwardly in response to centrifugal force, spring means for normally maintaining said shoe and said fly-weight inwardly, a blocking element on said drive member, said blocking member being movable by said drive member upon relative rotation of said members in one direction into a position blocking said fly-weight from forcing said shoe outwardly, said blocking element being movable by said driving member out of said blocking position upon relative rotation of said members in the opposite direction.

2. A speed governing device comprising a stationary drum-shaped casing having a circular braking surface, a shaft carried by said casing and extending concentrically of said braking surface, a driving member carried by said shaft and rotatable about the axis of said braking surface, said driving member having a flange integral therewith, a driven plate mounted on said driving member for rotation about said axis and relative to said driven member, means forming a lost motion connection between said plate and said driving member, means including a friction shoe located between said plate and said flange, means on said plate supporting said friction shoe for movement toward said braking surface, a flyweight, and means on said plate supporting said flyweight for movement against said shoe whereby to force said shoe outwardly into contact with said braking surface; a blocking element on said flange and movable by said flange upon relative rotation of said flange and said plate in one direction into a position blocking said flyweight from forcing said shoe outwardly, said blocking element being movable by said flange out of said blocking position upon relative rotation of said flange and said plate in the opposite direction.

3. A speed governing device comprising a stationary drum-shaped casing having a circular internal braking surface, said drum being open at one end and closed at its other, a stationary shaft carried by said closed end of said casing and projecting through said open end, said shaft extending coaxially of said braking surface, a driving member rotatably mounted on said shaft, said driving member having a flange integral therewith, a driven plate spaced from said flange and mounted on said driving member for rotation relative thereto about the axis of said braking surface, means forming a lost motion connection between said plate and said driving member, means including a friction shoe located between said plate and said flange, means on said plate supporting said friction shoe for movement toward said braking surface, a fly-weight, and means on said plate supporting said fly-weight for movement against said shoe whereby to force said shoe outwardly in response to centrifugal force into contact with said braking surface; a blocking element on said flange and movable by said flange upon relative rotation of said flange and said plate in one direction into a position blocking said fly-weight from forcing said shoe outwardly, said blocking element being movable by said flange out of said blocking position upon relative rotation of said flange and said plate in the opposite direction.

4. A speed governing device comprising a stationary drum-shaped casing having a circular braking surface, a shaft carried by said casing and extending concentrically of said braking surface, a driving member carried by said shaft and rotatable about the axis of said braking surface, a driving disc integral with said driving member, a driven plate spaced from said driving disc and mounted on said driving member for rotation relative thereto about said axis, means forming a lost motion connection between said disc and plate, a friction shoe, means pivotally supporting said friction shoe on said driven disc for movement outwardly into engagement with said braking surface, a fly-weight, means pivotally supporting said fly-weight on said driven plate, said fly-weight being movable outwardly against said shoe in response to centrifugal force to force said shoe outwardly, spring means normally retaining said shoe and said fly-weight from outward movement, a blocking element carried by said driving disc and movable by said driving disc upon relative movement of said disc and plate in one direction into a position blocking said fly-weight from forcing said shoe outwardly, said blocking element being movable by said driving plate out of said blocking position upon relative movement of said disc and plate in the opposite direction.

References Cited in the file of this patent

UNITED STATES PATENTS 2,388,946    Beall ----------------- Nov. 18, 1945

UNITED STATES PATENT OFFICE
CERTIFICATE OF CORRECTION

Patent No. 2,793,715                                            May 28, 1957

Lloyd L. Fielder, Jr., et al.

It is hereby certified that error appears in the printed specification of the above numbered patent requiring correction and that the said Letters Patent should read as corrected below.

Column 4, line 5, for "fly-wheel" read -- fly-weight --.

Signed and sealed this 6th day of August 1957.

(SEAL)
Attest:
KARL H. AXLINE
Attesting Officer

ROBERT C. WATSON
Commissioner of Patents